(12) United States Patent
Evans et al.

(10) Patent No.: US 8,700,618 B2
(45) Date of Patent: Apr. 15, 2014

(54) TRACKING IMPLICIT TRAJECTORY OF CONTENT SHARING

(75) Inventors: Michael Evans, Laguna Beach, CA (US); Brian Guarraci, Portland, OR (US); Pete Parsons, Bellevue, WA (US); Michel Bastien, Seattle, WA (US); Matty Noble, Seattle, WA (US); Ben Straley, Seattle, WA (US)

(73) Assignee: Covario, Inc., San Diego, CA (US)

( * ) Notice: Subject to any disclaimer, the term of this patent is extended or adjusted under 35 U.S.C. 154(b) by 861 days.

(21) Appl. No.: 12/464,703

(22) Filed: May 12, 2009

(65) Prior Publication Data
US 2009/0282052 A1 Nov. 12, 2009

Related U.S. Application Data

(60) Provisional application No. 61/052,596, filed on May 12, 2008, provisional application No. 61/111,639, filed on Nov. 5, 2008, provisional application No. 61/114,400, filed on Nov. 13, 2008, provisional application No. 61/160,628, filed on Mar. 16, 2009.

(51) Int. Cl.
*G06F 17/30* (2006.01)
*G06F 15/16* (2006.01)

(52) U.S. Cl.
USPC ............ 707/726; 707/736; 707/751; 709/203

(58) Field of Classification Search
CPC .................................. G06F 17/30; G06F 15/16
USPC .......... 707/999.01, 999.1, E17.107, E17.111, 707/E17.116, E17.119, 726, 736, 751; 709/201, 202, 203, 204, 206, 217, 218, 709/219, 223, 227, 231, 245, 229; 715/205
See application file for complete search history.

(56) References Cited

U.S. PATENT DOCUMENTS

| | | | | |
|---|---|---|---|---|
| 6,138,128 A * | 10/2000 | Perkowitz et al. | ............ | 715/205 |
| 6,405,175 B1 * | 6/2002 | Ng | .............. | 705/14.26 |
| 6,804,660 B2 * | 10/2004 | Landau et al. | ............. | 705/14.73 |
| 7,039,699 B1 * | 5/2006 | Narin et al. | .................... | 709/224 |
| 7,337,133 B1 * | 2/2008 | Bezos et al. | ................. | 705/27.1 |
| 7,730,216 B1 | 6/2010 | Issa et al. | | |
| 2002/0026500 A1 | 2/2002 | Kanefsky et al. | | |
| 2002/0069116 A1 * | 6/2002 | Ohashi et al. | ................... | 705/26 |
| 2002/0082923 A1 | 6/2002 | Merriman et al. | | |
| 2002/0198962 A1 * | 12/2002 | Horn et al. | .................... | 709/218 |

(Continued)

OTHER PUBLICATIONS

U.S. Appl. No. 13/093,805, filed Apr. 25, 2011, Straley.

(Continued)

*Primary Examiner* — Pierre Vital
*Assistant Examiner* — Evan Aspinwall
(74) *Attorney, Agent, or Firm* — Perkins Coie LLP

(57) ABSTRACT

A facility for tracking the sharing of distinguished content is described. When a user seeks to access the distinguished content from a client computer system using a URL associated with the distinguished content, the facility determines whether a user identifier is represented in the URL. If a user identifier is represented in the URL that is different from a user identifier that is persistently stored by the client computer system, the facility determines that the distinguished content has been shared with a user identified by the user identifier that is persistently stored by the client computer system by a user identified by the identifier represented in the URL.

23 Claims, 9 Drawing Sheets

(56) References Cited

U.S. PATENT DOCUMENTS

| | | |
|---|---|---|
| 2005/0050088 A1* | 3/2005 | Kotler et al. .................. 707/102 |
| 2005/0076097 A1* | 4/2005 | Sullivan et al. ............... 709/218 |
| 2005/0125289 A1 | 6/2005 | Beyda et al. |
| 2005/0203801 A1* | 9/2005 | Morgenstern et al. .......... 705/14 |
| 2006/0224721 A1* | 10/2006 | Rowe et al. ................... 709/224 |
| 2006/0224729 A1* | 10/2006 | Rowe et al. ................... 709/224 |
| 2007/0136279 A1* | 6/2007 | Zhou et al. ......................... 707/6 |
| 2007/0260605 A1* | 11/2007 | Norman et al. ................. 707/10 |
| 2007/0270165 A1 | 11/2007 | Poosala |
| 2008/0040426 A1* | 2/2008 | Synstelien et al. ............ 709/203 |
| 2009/0198711 A1 | 8/2009 | Datar et al. |
| 2009/0282052 A1 | 11/2009 | Evans et al. |
| 2010/0010906 A1 | 1/2010 | Grecia |
| 2010/0125505 A1 | 5/2010 | Puttaswamy |
| 2010/0217670 A1 | 8/2010 | Reis et al. |
| 2010/0228614 A1 | 9/2010 | Zhang et al. |
| 2010/0228631 A1 | 9/2010 | Zhang et al. |
| 2010/0332312 A1 | 12/2010 | Klinger et al. |

OTHER PUBLICATIONS

Gipson, Melinda, "OExchange Protocol Standardizes Web Sharing Tools," Digidaydaily.com, Jun. 2, 2010, 5 pages.

Gipson, Melinda, "AddThis Adds Ad Targeting to Reach One Billion Consumers," Digidaydaily.com, Aug. 5, 2010, 3 pages.

PCT International Search Report and Written Opinion for International Application No. PCT/US09/43655, date of mailing Jul. 23, 2009, 12 pages.

PCT International Search Report and Written Opinion for International Application No. PCT/US12/34714 filed Apr. 23, 2012, Applicant: Meteor Solutions, Inc., mailed Jul. 13, 2012, 8 pages.

* cited by examiner

TRACKING IMPLICIT TRAJECTORY OF CONTENT SHARING

CROSS-REFERENCE TO RELATED APPLICATIONS

This application claims the benefit of the following provisional applications, each of which is hereby incorporated by reference in its entirety: U.S. Provisional Patent Application No. 61/052,596, filed May 12, 2008; U.S. Provisional Patent Application No. 61/111,639, filed Nov. 5, 2008; U.S. Provisional Patent Application No. 61/114,400, filed Nov. 13, 2008; and U.S. Provisional Patent Application No. 61/160,628, filed Mar. 16, 2009.

BACKGROUND

Many analytics solutions exist to track the movement of users between pages of a web site. Conventional analytics solutions allow the operator of a site to classify some of the actions users may take on the site as conversions that have special value to the operation, such as purchasing an item, signing up for a newsletter, or sharing a content item with a friend. This approach can be useful in determining how the various pages on a site affect an end-user's performance of such conversion actions. This approach can also answer the question of which external sites were the most effective at directly driving people to both visit the site and convert.

DETAILED DESCRIPTION

Figure 1:
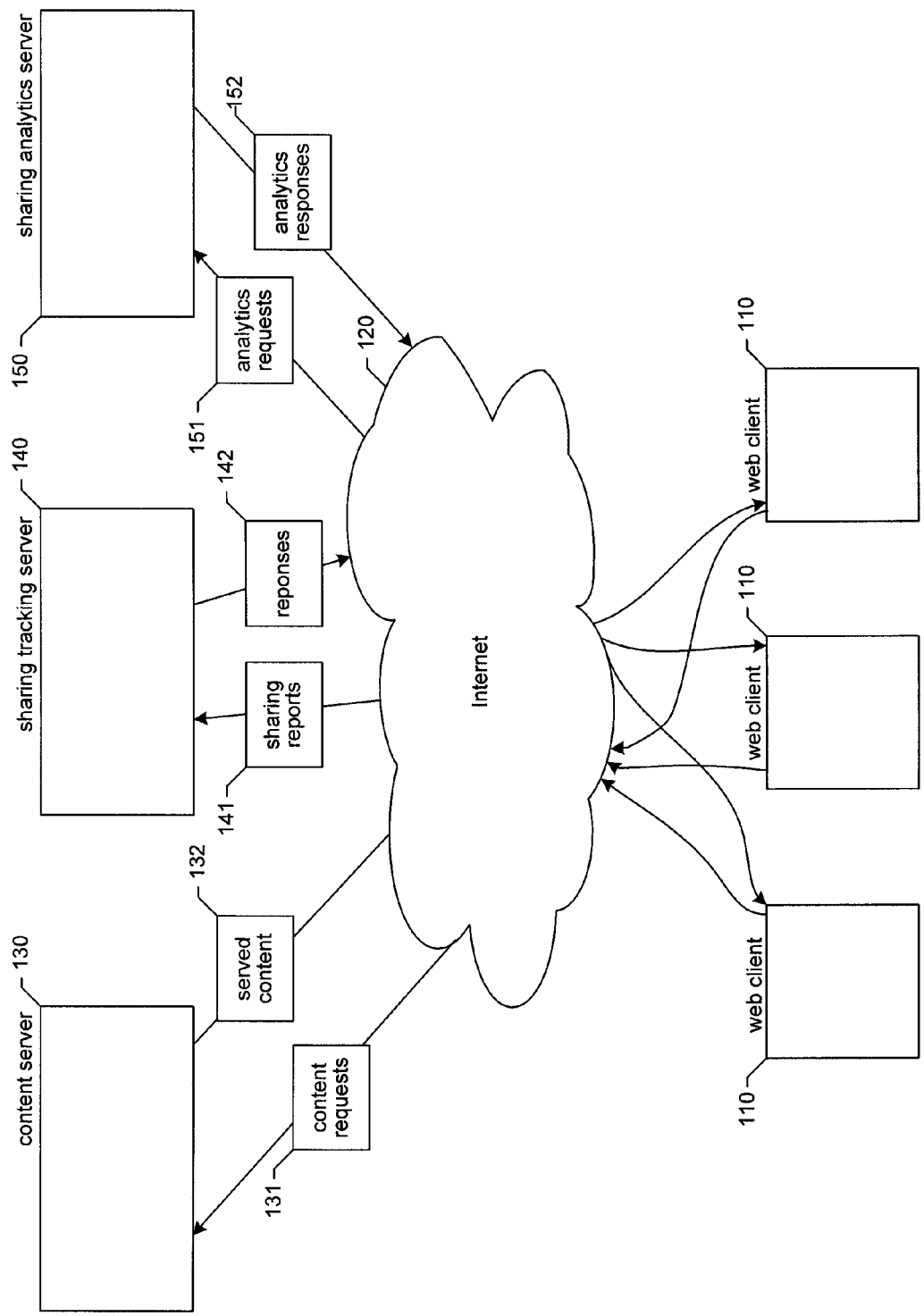
FIG. 1 is a high-level data flow diagram showing data flow within a typical arrangement of components used to provide the facility.

The inventors have identified shortcomings in conventional analytics solutions. In particular, in many cases conversions are not primarily motivated by direct referral from an external site or by content on the site itself. In many cases, conversions are motivated by indirect referrals from friends and family, or by social networking and social bookmarking activities on sites such as Facebook or Digg. Such "friends and family" referrals often take the form of sharing a particular item of content from the referrer to the referee. Conventional analytics solutions fail to consider these cases, which in some campaigns can account for a substantial fraction of traffic to a site.

To overcome these shortcomings of conventional analytics solutions, the inventors have identified an approach to analytics that tracks conversions relative to content sharing. The conversion attribution technique described herein builds on a technique for tracking the implicit trajectory of URL sharing, and offers a way to attribute individual conversions to those sharing trajectories. It allows site owners to answer the question, "To what extent is my online revenue due to sharing, and which sharing actions, channels, or websites were catalysts for that sharing?"

The internet is filled with web sites for sharing URLs to "interesting" content. Many people spend considerable time finding interesting content and then passing it on to friends via email, instant messenger and dedicated link sharing sites (like reddit.com and digg.com). A common example would be a video shared on youtube.com.

Have you seen this? http://www.youtube.com/watch?v=oiHCR19Ckkw

A software and/or hardware facility for tracking the implicit trajectory of content sharing ("the facility") is described. In various embodiments, the facility tracks various types of content, including web pages or portions of web pages, such as widgets. A widget is a largely self-contained portion of a web page, in some cases added to a web page by adding to the source for the web page an inclusion reference that points to code and/or content for the widget. For example, some video sharing services permit a widget containing a player for playing a particular video sequence hosted by the video sharing service to be added to any web page by adding to the source for the web page an inclusion reference pointing to the video sequence.

In some embodiments, the facility tracks the sharing of content that is accomplished by providing a reference to the content—such as a URL pointing to the content—to another user. For example, the shared URL or other reference may point to a web page, a widget, an image, an Adobe Flash show, etc. that a sharing source user wishes to share with a sharing target user. The sharing source user may select any of a large number of communication modalities to communicate the reference to another user, such as email; instant messaging; a blog, social networking site user page, or other web page; a bookmark sharing service; or even voice or handwriting. This form of sharing is sometimes referred to as sharing by reference.

In some embodiments, the facility tracks the sharing of content by reference by embedding into a reference to content a sharing source identifier that identifies the user most recently observed to possess a this version of the reference. When a user accesses content by dereferencing a reference containing a sharing source identifier, such as by instructing a browser to load and display content referred to by a URL, the facility determines whether the sharing source identifier matches an identifier identifying the accessing user. If these identifiers do not match, the facility (a) generates an indication that the user identified by the sharing source identifier shared the content identified by the invariant part of the URL (that is, the part of the URL that is not the sharing source identifier) with the accessing user, and (b) modifies the reference to change the sharing source identifier it contains to match the identifier identifying the accessing user.

In some embodiments, generating the sharing indication specifying the sharing source identifier and the identifier of the accessing user—also referred to as the sharing target identifier—involves augmenting a sharing graph in which a new node representing the sharing target identifier is created as a child of an existing node representing the sharing source identifier. In some embodiments, users in various categories of users are able to access and display some or all of the sharing tree maintained in this manner by the facility.

In some embodiments, the facility (or a separate mechanism) tracks conversions by users in terms of the same user identifiers used to track content sharing. This enables the facility to identify, for each conversion, any sequences of users who shared content to the converting user that relates to the conversion, either because the content was shared to the converting user shortly in advance of the conversion, the nature of the shared content relates specifically to the nature of the conversion, or both.

In various embodiments, the facility produces a variety of other useful output, including visual or machine-encoded data regarding visitors and/or conversions as the result of sharing, either generally, on a per-referrer-site basis, or a per-referrer-user basis.

In some embodiments, steps (a) and (b) described above are performed at least in part by script code or other code executed by the browser on the computer system being used by the sharing target user. In some embodiments, these steps are performed wholly by one or more servers that are distinct from the computer system being used by the sharing target user, sometimes referred to as tracking servers. A tracking server can be incorporated into a content server serving the shared content, or can alternatively be implemented separately from the content server.

In some embodiments, the facility can independently track the sharing of two or more pieces of content included in the same web page, or in the same container of another type. For example, the facility may independently track multiple widgets included in the same page.

In some embodiments, rather than or in addition to tracking the sharing of content by reference, the facility tracks the sharing of content by value, in which the user shares the content by providing the data making up the content to the sharing target user. For example, the sharing source user may provide the data making up an image, an audio sequence, a computer game or other program, etc. In such cases, the facility typically embeds the sharing user identifier in the shared data, in some cases in addition to a content id. Tracking sharing by value typically also involves embedding tracking code in the shared data, or installing tracking code on the computer system on which the shared data is accessed.

In some embodiments, in addition to tracking the implicit sharing of content, the facility also tracks the explicit sharing of content, such as sharing that the sharing source user accomplishes by operating a special sharing mechanism made available to the sharing source user in connection with the content. In various embodiments, the facility tracks the explicit sharing of contents and/or displays the results of sharing tracking in some or all of the ways described in U.S. patent application Ser. No. 11/756,068, filed May 31, 2007, which is hereby incorporated by reference in its entirety.

By performing in some or all of these ways, the facility provides information about the sharing of content; enables users who share content in a way that is useful to advertisers or others to be rewarded enables users who share content in a way that is useful to advertisers or others to be rewarded; allows advertisers and others who benefit from the sharing of content to better understand the details of how they have benefited from the sharing of content, and may benefit in the future. For example, this sharing information may be used to increase the advertising rates paid by advertisers to publishers having high sharing rates or conversion-based-on-sharing rates; market to advertisers publishers having high sharing rates or conversion-based-on-sharing rates; enable advertisers to allocate advertising buys to publishers based on their individual experience with the publisher's sharing rates and conversion-based-on-sharing rates; etc.

FIG. 1 is a high-level data flow diagram showing data flow within a typical arrangement of components used to provide the facility. A number of web client computer systems 110 that are under user control generate and send content requests 131 to a logical content server 130 via a network such as the Internet 120. These requests typically include page view requests or other kinds of requests for content. Typically, each content request specifies a reference for content to be returned, such as a URL. Within the web server, these requests may either all be routed to a single content server computer system, or may be load-balanced among a number of content server computer systems. The content server typically replies to each with served content 132. In various embodiments, each web client that retrieves content whose sharing is being tracked also interacts with a sharing tracking server 140. The web client sends one or more sharing reports 141, and typically receives a response 142 for each sharing request sent. In some embodiments, certain web clients communicate with a sharing analytics server 150. These clients send analytics requests 151 for particular sharing analytics information, and receive analytics responses 152 that are responsive to the requests. Users may use a variety of applications to provide content or references to content to other users to effect the sharing of content.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, digital video recorders, set top boxes, cameras, automobile computers, etc.

Figure 2:
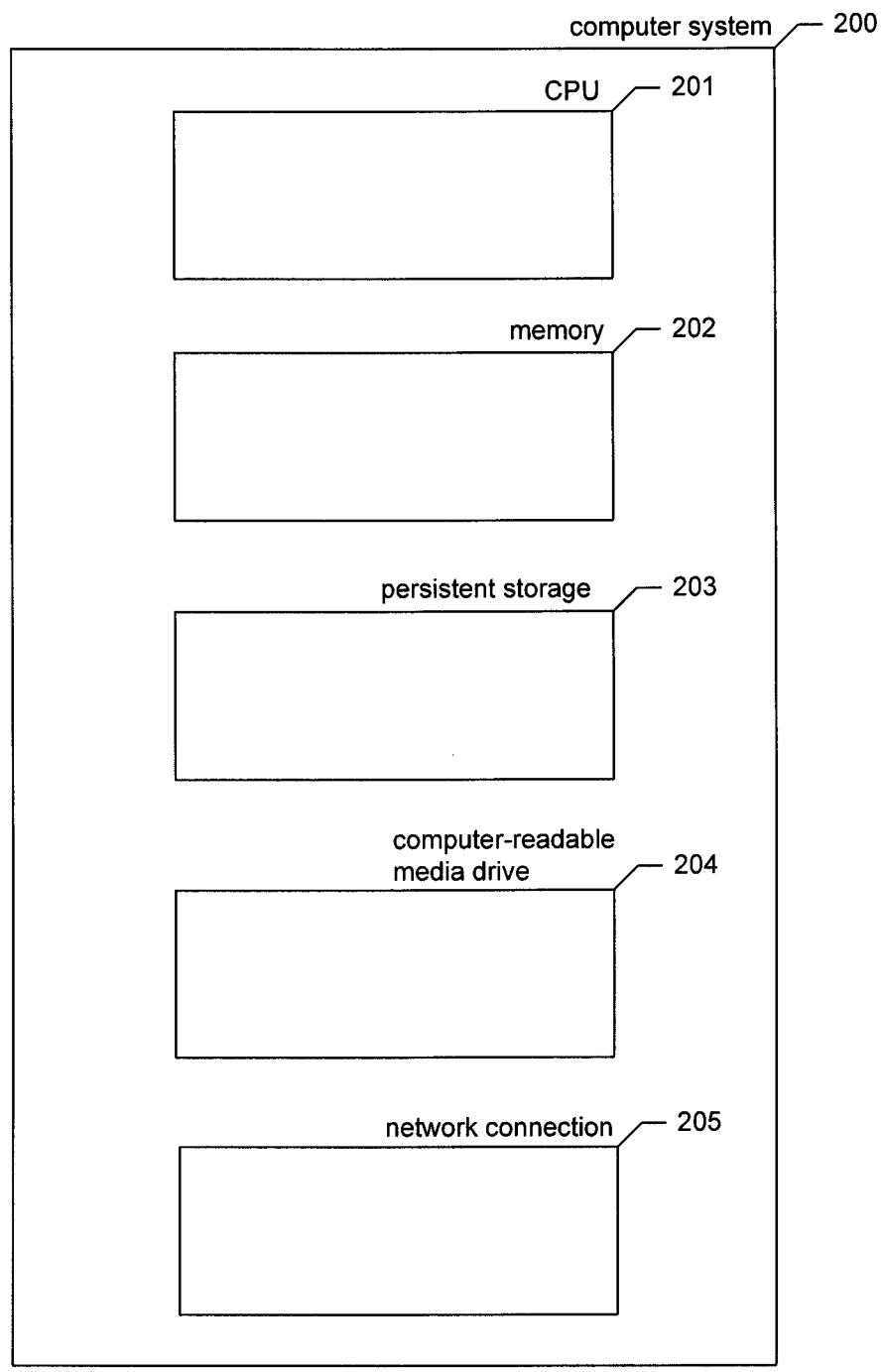
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet or one or more other data transmission networks, so that data signals such as data signals conveying data structures may be sent between such computer systems. While computer systems configured as described above are typically used to support the operation of the facility, those skilled in the art will appreciate that the facility may be implemented using devices of various types and configurations, and having various components.

Figure 3:
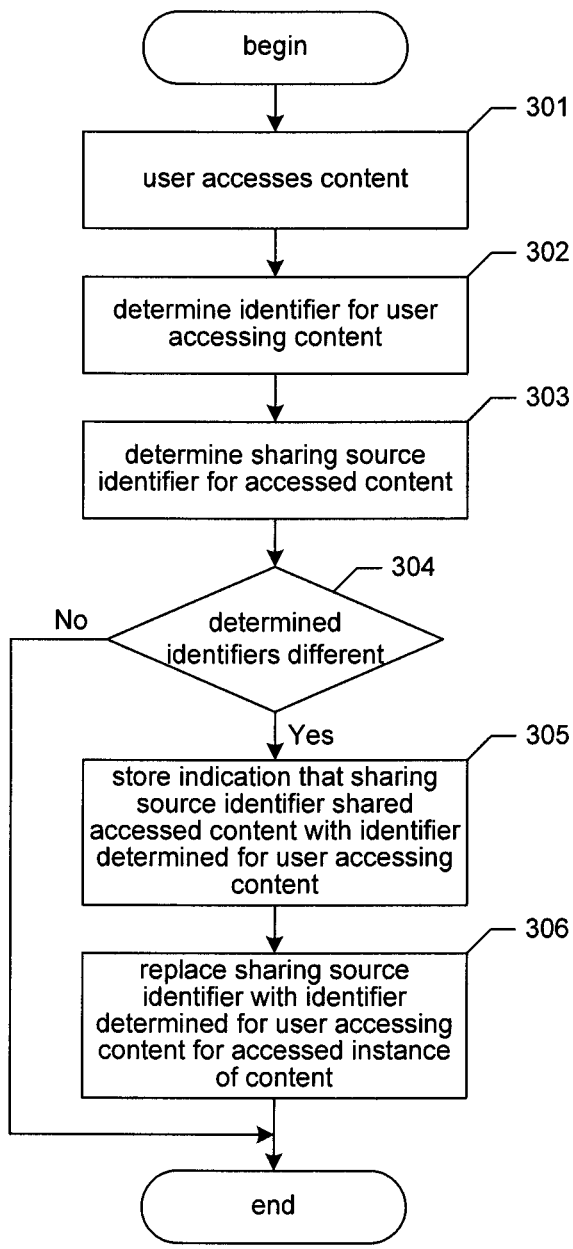
FIG. 3 is a flow diagram showing steps typically performed by the facility in order to track the sharing of a piece of content between a pair of users.

FIG. 3 is a flow diagram showing steps typically performed by the facility in order to track the sharing of a piece of content between a pair of users. The user who shared the content is referred to herein with respect to this particular instance of sharing as the sharing source user. The user to whom the piece of content is shared is referred to herein with respect to this instance of sharing as the sharing target user. In step 301, the user accesses a particular piece of content. In various embodiments, this content accessing takes a variety of forms. In some embodiments, the user accesses the piece of content in step 301 by dispatching a request identifying the content, such as an HTTP request identifying a URL specifying the content, to a content server, such as by using a web browser application executing on a client computer system or other device used by the user. The accessed content is often displayed or otherwise presented to the accessing user.

In step 302, the facility determines an identifier for the user accessing the content. This identifier is typically determined with reference to the client computer system. An identifier for the user may be stored in one or more of a variety of forms such as any of the following: http cookies, third-party cookies, DOM storage, Internet Explorer userData, flash local shared objects, IP address, MAC address, user log-in, serial number for some device on the user's computer system such as processor serial number, etc. If the facility determines that the user accessing the content has not yet been attributed an identifier, the facility typically attributes an unused identifier to the accessing user, such as with reference to the sharing tracking server. In step 303, the facility determines a sharing source identifier for the accessed content. Where content is shared by reference, the sharing source identifier is typically stored in the reference to the content that is forwarded from the sharing source user to the sharing target user and used by the sharing target user to access the content. The sample URLs in the table below show examples of how the sharing source identifier, shown as "<identifier>", may be incorporated in references that are URLs.

TABLE 1 in URL Segments: http://www.samplesite.com/sample_page/<identifier>/
in Query String: http://www.samplesite.com/
sample_page?some_key=<identifier>
in Hash: http://www.samplesite.com/sample_page#<identifier>
in Sub Domain: http://<identifier>.samplesite.com/sample_page In some embodiments, the facility encodes both the sharing source identifier and information identifying the shared content in the URL in an indivisible way. For example, the URL "http://www.samplesite.com/54137618" may encode the sharing source identifier 9738 and the content identifier 76, while the URL "http://www.samplesite.com/98148271" may encode the sharing source identifier 2301 and the content identifier 76. In such embodiments, a mapping is maintained from each URL or URL segment to a corresponding sharing source identifier+content identifier tuple. Such embodiments may be implemented in connection with a "URL shortening service," such as bit.ly, tinyurl.com, is.gd, eKey.us, Cli.gs, or SnipURL.

In step 304, if the identifiers determined in steps 302 and 303 are different, then the facility continues in step 305, else the steps conclude. In step 305, the facility stores an indication that the sharing source identifier shared the accessed content with the identifier determined for the user accessing the content. In some embodiments, this involves augmenting a sharing tree maintained for the accessed content, as is described in more detail below in connection with FIGS. 4 and 5.

Figure 4:
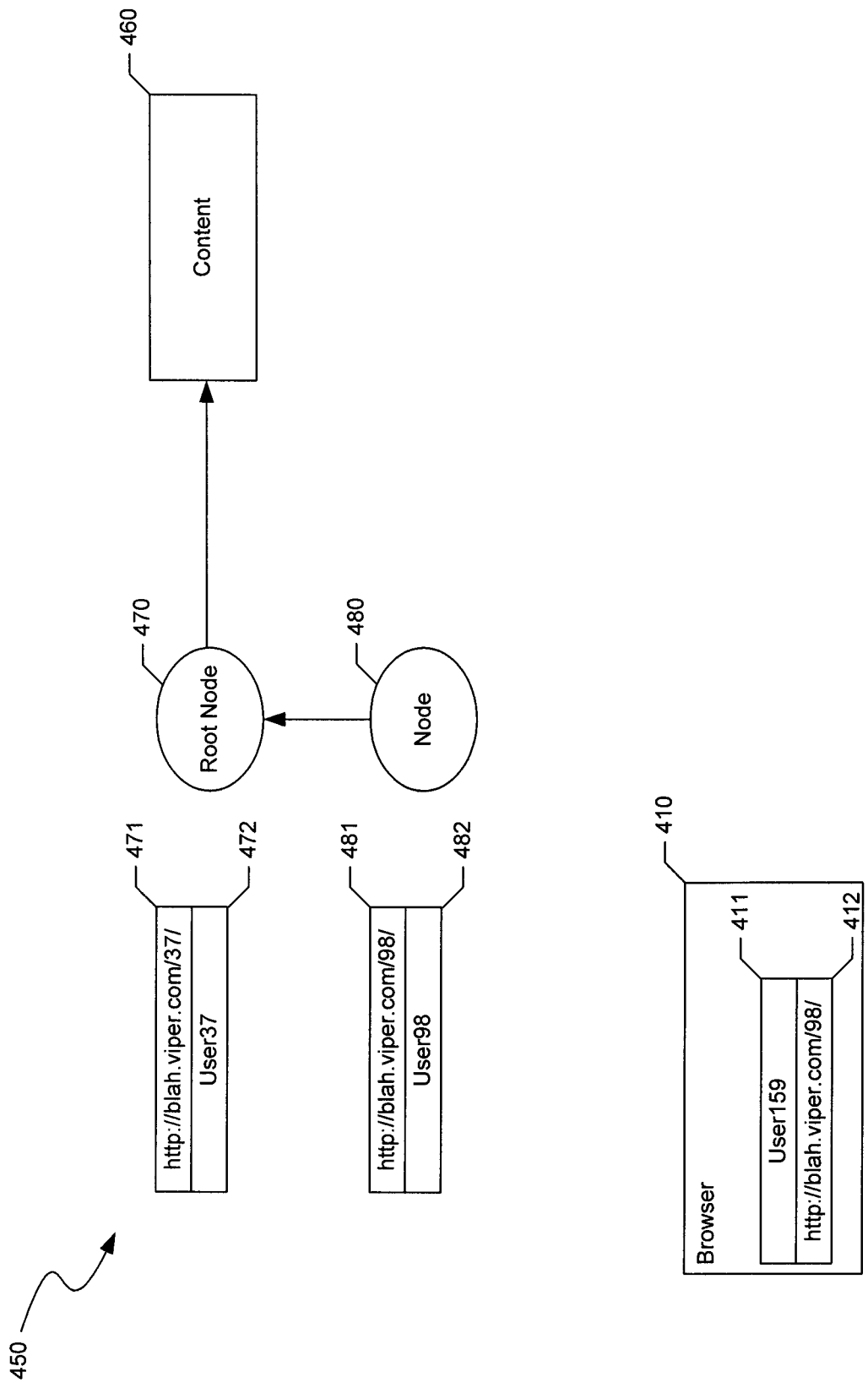
FIG. 4 is a data structure diagram showing sample initial contents of a content sharing tree data structure maintained by the facility.

FIG. 4 is a data structure diagram showing sample initial contents of a content sharing tree data structure maintained by the facility. This data structure is typically stored by a computer system, such as in volatile and/or persistent memory, and reflects the state of the data structure after a user has accessed content in step 301, but before the facility stores an indication in step 305. The tree has a root node 470, which identifies the piece of content 460 whose sharing is tracked by the tree. Attached to the root node 470 is a URL 417 that identifies both the content 460 ("http:/blah.viper.com") as well as the user responsible for generating a content or making the content available ("/37/"). Also attached to the root node is an indication 472 of the identity of this user. Node 480 is a child node of root node 470, indicating that it corresponds to the sharing of the content 460 from user 37 to another user. In particular, the URL 481 and indication 482 of the sharing target ID show that this node corresponds to the sharing of content 460 from user 37 to user 98. Action record 410 shows that user 159 has just retrieved content 460 using URL 412, which contains the sharing source identifier 37.

While FIG. 4 and each of the data structure diagrams discussed below show a data structure whose contents and organization are designed to make them more comprehensible by a human reader, those skilled in the art will appreciate that actual data structures used by the facility to store this information may differ from the data structure shown, in that they, for example, may be organized in a different manner; may contain more or less information than shown; may be compressed and/or encrypted; etc.

Figure 5:
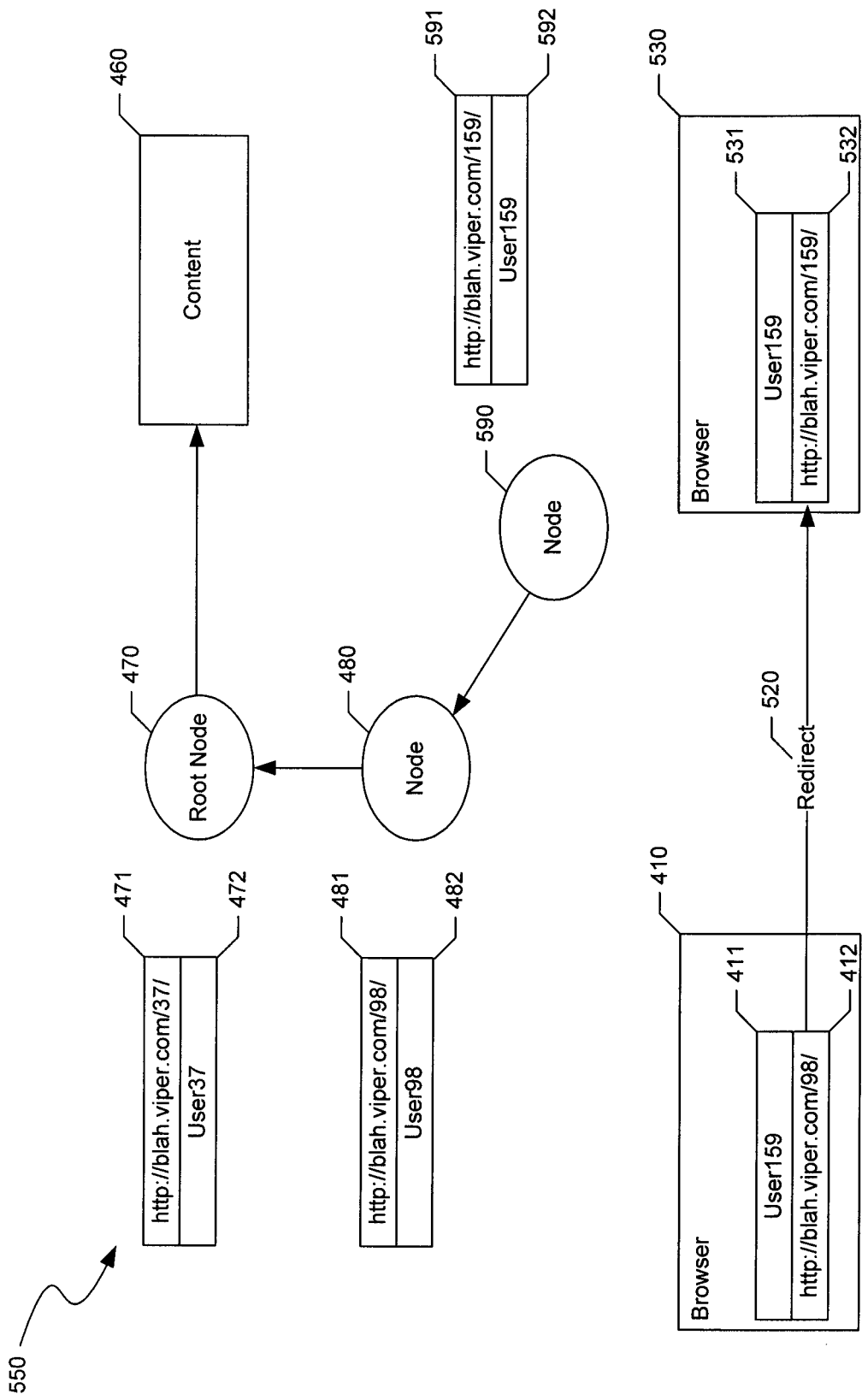
FIG. 5 is a data structure diagram showing sample updated contents of the sharing tracking tree data structure shown in FIG. 5.

FIG. 5 is a data structure diagram showing sample updated contents of the sharing tracking tree data structure shown in FIG. 5. The sharing tracking tree data structure has been augmented to reflect the new instance of sharing shown in action record 410. In particular, the facility has added a new node 590 as a child of node 480, indicating that new node 590 represents the sharing of content 460 from user 98 to user 159.

Returning to FIG. 3, in step 306, the facility replaces the sharing source identifier with the identifier determined for the user accessing the content for the accessed instance of content. In some embodiments, the facility performs step 306 by redirecting the accessing user's browser to a version of the URL in which the sharing source identifier has been replaced with the identifier determined for the accessing user. This may be accomplished in a variety of ways, including causing the content server to perform the redirect in response to the initial request for content, on consultation with the sharing tracking server; changing the URL via code running on the client computer, such as Java, Javascript, Flash, or Silverlight code; issuing a command via a header from the server typically using the Location header; or issuing a command in HTML or another tag language such as <meta http-equiv="refresh" content="0; url=http://sample.com/new_id/">.

Returning to FIG. 5, record 530 shows the replacement in the URL of the sharing source identifier 98 with the identifier determined for the accessing user 159.

Referring to FIG. 3, after step 306, these steps conclude. Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; etc.

In a server-based approach to tracking, the interaction is all between the viewing machine and the content server. Some of the operations of the Content Server may be assisted by the Tracking Server, such as to generate Ids and record information. The server-based approach to tracking proceeds as shown below in Table 2.

TABLE 2

1. User accesses content by opening a URL
2. Content Server checks the URL for an ID
3. If there an ID in URL, go to step 7
4. Content Server checks for an ID from the computer system that is accessing the content
5. If there is no ID from the computer system that is accessing the content
    a. Generate an ID; store it persistently on computer system on which content is being accessed and in URL
    b. Record this as new user
    c. stop
6. If there is an ID in permanent storage
    a. Set the URL ID to the permanent ID
    b. Record this as "user with ID opening no ID URL"
    c. stop
7. (this user has a URL ID) now get the ID from the computer system that is accessing the content
8. If there is no ID from the computer system that is accessing the content
    a. Generate a new ID
    b. Record this as sharing from an old user to this new ID
    c. Store it persistently on computer system on which content is being accessed and in URL
    d. stop
9. If there is an ID from the computer system that is accessing the content and it matches the ID from the URL
    a. Record this as the matching ID reopening the URL
    b. stop
10. If there is an ID from the computer system that is accessing the content and they don't match
    a. Record this as the ID from the computer system that is accessing the content opening the URL ID - showing from user having ID from URL storage to user having ID from permanent storage
    b. Set the URL ID to ID from the computer system that is accessing the content
    c. stop In a scripting based, synchronous approach to tracking, the control logic runs on the tracking server and the client has logic for following the tracking server's commands.

The process performed on the computer system accessing the content is as shown below in Table 3.

TABLE 3

1. Client machine opens a URL
2. Content Server provides a script directly or points to a script on a third party machine
3. Based on the script, the client machine takes the following set of actions:
    a. Checks to see if the machine is capable of storing information in some form of permanent storage, if not it halts
    b. Queries the tracking server with the permanent ID and the URL ID
    c. Based on the command of the tracking server, may set permanent ID or URL ID values The process performed by the tracking server for the scripting based, synchronous approach to tracking is as shown below in Table 4.

TABLE 4

1. Inspects the URL ID and the permanent ID
2. If they are both set and they match:
    a. Record this as that ID reopening the URL.
    b. Instruct the Viewing Machine to do nothing.
3. If they are both set and they do no match:
    a. Record this as the permanent ID opening the URL ID.
    b. Instruct the Viewing Machine to set the URL ID to match the permanent ID.
4. If the permanent ID is set, but the URL ID is not set
    a. Record this as the permanent ID opening a blank ID.
    b. Instruct the Viewing Machine to set the URL ID to match the storage ID.

TABLE 4-continued

5. If the URL ID is set but the permanent ID is not set:
    a. Record this as a new user opening content shared from the permanent ID.
    b. Generate a new ID
    c. Instruct the Viewing Machine to set that new ID as permanent and URL ID.

In a scripting based, asynchronous approach to tracking, all of the logic runs on the client; the tracking server just receives and records information from the client. The Asynchronous approach differs from the Synchronous approach described above in that, in the Asynchronous approach, the Viewing Machine does not need to wait on the tracking machine once it has fetched its script. The scripting based, asynchronous approach to tracking proceeds as shown below in Table 5.

TABLE 5

1. Client Machine opens a URL.
2. Client Machine (either has built-in) or loads a script from a server.
3. Based on the Client Side Script, the client machine takes the following set of actions:
4. If the client is not capable of storing information in permanent storage, then halt.
5. Client machine looks at URL ID and an ID from the computer system that is accessing the content
6. If the two IDs are not identical:
    a. If there is no ID from the computer system that is accessing the content, but there is a URL ID:
        1. On the client, generate a new ID
        2. Create and store a pending notification that the content was shared from the URL ID to the generated ID
        3. Set URL ID to the generated ID
        4. Report pending notifications to the Tracking Server TABLE 5-continued b. If there is an ID from the computer system that is accessing the content, but it does match the URL ID:
  1. Create a pending notification that the content was shared from the URL ID to the ID from the computer system that is accessing the content
  2. Set URL ID to the ID from the computer system that is accessing the content
  3. Report pending notifications to the Tracking Server
c. If there is an ID from the computer system that is accessing the content, but no URL ID
  1. Create a pending notification that the URL ID opened a piece of content with no ID
  2. Set the URL ID to the ID from the computer system that is accessing the content
  3. Report pending notifications to the Tracking Server
7. If they both are present and match:
  a. Check Persistent Storage on the Client Machine for pending notifications, if there are any send them to the Tracking Server then done.
  b. If there are no pending notifications, report this to the Tracking Server as the ID being reopened
8. Done In some embodiments, the facility tracks the sharing of widgets. A widget is content that can be embedded inside a web page and easily shared by users allowing them to easily add it to their own web pages. For example, a YouTube video sequence that can be added to a user's web page is one form of widget.

The facility tracks the sharing of widgets via two paths: page sharing (when users share a URL for a web page that has widget content) and widget sharing (when a user copies a widget and adds it to his or her own web page).

When a user initially traverses to any given page containing a widget, the page will have two unique identifiers: one is stored in the widget and the other is stored in the URL.

The process by which the facility tracks the sharing of widgets is shown below in Table 6.

TABLE 6

1. User opens page with a widget and its tracking codes
2. For each widget with tracking code, find the 2 identifiers on this page: (URL identifier & Widget Identifier)
3. Get this user's identifier or generate a new one: ideally this would be consistent across all sites (such as flash storage or a 3$^{rd}$ party cookie)
4. Report these three identifiers, along with the complete URL and referrer information to the Tracking Server.
5. If the identifier set in the URL is different then this user's identifier, change it to match this users identifier.

TABLE 6-continued

6. If the user embeds this widget into another page, make that widget identifier match this users identifier, typically by changing the embed code.

Table 7 below shows original Javascript code for incorporating a video sequence widget into a web page.

TABLE 7

```
<object width="480" height="295"><param name="movie"
value="http://www.youtube.com/v/
5mvtU4xZPvQ&hl=en&fs=1"></param><param
name="allowFullScreen"         value="true"></param><param
name="allowscriptaccess"
value="always"></param><embed
src="http://www.youtube.com/v/5mvtU4xZPvQ&hl=en&fs=1"
type="application/x-shockwave-flash" allowscriptaccess="always"
allowfullscreen="true" width="480" height="295"></embed></object>
```

Table 8 below shows a manner in which the code for incorporating a widget can be encoded in order to support tracking of the sharing of the widget.

TABLE 8

```
<script type="text/javascript"
src="http://static.meteorsolutions.com/meteor.js"></script><script
type="text/javascript">meteor.widget_tracker.get("1","2").-
set({"html":"%3Cobject%20width%3D%22480%22
%20height%3D%22295%22%3E%3Cparam%20name%3D%22movie-
%22%20value%3D%22http%3A//www.youtube.com/v/5mvtU4
xZPvQ%26hl%3Den%26fs%3D1%22%3E%3C/param%3E%3Cparam-
%20name%3D%22allowFullScreen%22%20value%3D%22true%
22%3E%3C/param%3E%3Cparam%20name%3D%22allowscriptaccess-
%22%20value%3D%22always%22%3E%3C/param%3E%3Cembed
%20src%3D%22http%3A//www.youtube.com/v/5mvtU4xZPvQ%26hl-
%3Den%26fs%3D1%22%20type%3D%22application
/x-shockwave-
flash%22%20allowscriptaccess%3D%22always%22%20allowfullscreen%-
3D%22true%22%20width%3D%22480%22%20height
%3D%22295%22%3E%3C/embed%3E%3C/object%3E",
"embed_code_from_id":"91358671"}).track().write();</script
>
```

The "1" string identifies a customer that is tracking the sharing of the widget, while the "2" string identifies a widget. The "91358671" string identifies the user who was the source of the current instance of the widget.

Table 9 below shows sample Javascript included in a tracked page containing a widget to conduct the client process discussed above.

TABLE 9

```
// Widget Tracker
//
// for tracking widgets
meteor.add_to({ widget_tracker : {
    trackers : [ ],
    from_id : false,
    to_id : false,
    hash_prefix : '#meteor_widget:',
    // calculates what from id is set (if any)
    build_from_id : function( )
    {
        var widget_tracker = meteor.widget_tracker;
        meteor.once.run('widget_tracker_from_id', function( ) {
            var hash = document.location.hash;
            if (hash.indexOf(widget_tracker.hash_prefix) == 0) {
                widget_tracker.from_id                           =
hash.substring(widget_tracker.hash_prefix.length);
            }
        });
        return widget_tracker.from_id;
```

TABLE 9-continued

```
        },
        set_to_id : function( )
        {
            var widget_tracker = meteor.widget_tracker;
            meteor.once.run('widget_tracker_to_id', function( ) {
                // if the hash is valid (or empty)
                if ((widget_tracker.from_id !== false) || (window.location.hash == '')) {
                    meteor.global_id.get(function(global_id) {
                        if (global_id != '') {
                            window.location.hash           =
meteor.widget_tracker.hash_prefix + global_id;
                            widget_tracker.to_id = global_id;
                        }
                        meteor.fence.alert('widget_tracker_to_id');
                    });
                }
            });
        },
        report_data : function(preferences)
        {
            var widget_tracker = meteor.widget_tracker;
            meteor.fence.wait('widget_tracker_to_id', function( ) {
                var data = { };
                data.application_id = preferences.application_id;
                data.widget_id = preferences.widget_id;
                data.embed_code_from_id = preferences.embed_code_from_id;
                data.from_id = widget_tracker.from_id;
                data.to_id = widget_tracker.to_id;
                data.referrer = document.referrer;
                data.location = window.location;
                meteor.json_query(meteor.construct_url('sharing',
'api/widget_tracker'), data);
            });
        },
        internal_track : function(preferences)
        {
            var widget_tracker = meteor.widget_tracker;
            widget_tracker.build_from_id( );
            widget_tracker.set_to_id( );
            widget_tracker.report_data(preferences);
        },
        internal_write : function(preferences)
        {
            document.write(unescape(preferences.html));
            document.write('<div><a                href="#"
onclick="meteor.widget_tracker.internal_show_embed_code(this,         \"        +
preferences.application_id    +    '\',   \"   +    preferences.widget_id    +    '\',   \"   +
preferences.embed_code_from_id   +   '\',   \"   +   preferences.html   +   '\'); return false">Get
Embed Code</a></div>');
        },
        internal_show_embed_code : function(el, application_id, widget_id, html)
        {
            var tracker = meteor.widget_tracker.get(application_id, widget_id);
            // show the embed code right away even if we don't have this
            var embed_code_from_id = meteor.global_id.get_if_available( ) + '';
        var prefs_string = meteor.json_encode({ 'html' : tracker.preferences.html,
'embed_code_from_id' : embed_code_from_id});
            var   embed   =   '<script    type="textVjavascript"         src="meteor-
uncompressed.js"><Vscript>';
            embed += '<script type="textVjavascript">meteor.widget_tracker.get(';
            embed += '"' + application_id + '",';
            embed += '"' + widget_id + '"';
            embed += ').set(' + prefs_string + ').track( ).write( );</script>';
            var parent = el.parentNode;
            parent.innerHTML  =  '<input   type="text"   readonly=""  onclick="this.select( )"
value="Embed Code"/>';
            var node = parent.firstChild;
            node.value = embed;
            node.select( );
        },
        get : function(application_id, widget_id) {
            var widget_tracker = meteor.widget_tracker;
            var tracker;
            for (var index = 0; index < widget_tracker.trackers.length; index++) {
                tracker = widget_tracker.trackers[index];
                if ((application_id == tracker.application_id) && (widget_id ==
tracker.widget_id)) {
                    return tracker.tracker;
                }
            }
```

TABLE 9-continued

```
        tracker = {
            preferences : {
                'embed_code_from_id' : ",
                'html' : ",
                'application_id' : application_id + ",
                'widget_id' : widget_id + ",
            },
            track : function ( ) {
                widget_tracker.internal_track(tracker.preferences);
                return tracker;
            },
            set : function(preferences)
            {
                for (var key in preferences) {
                    tracker.preferences[key] = preferences[key];
                }
                return tracker;
            },
            write : function(html) {
                widget_tracker.internal_write(tracker.preferences, html);
            }
        };
        widget_tracker.trackers.push({ 'application_id' : application_id, 'widget_id' :
widget_id, 'tracker' : tracker});
        return tracker;
    }
}});
// step 1 : find the from ID and store it (empty or not)
// step 2 : the first widget that tracks, set the ID (if allowed, we won't override a hash that is
present)
// step 3 : each widget that calls track report the analytics data
```

Table 10 below shows how the encoded version of the widget in Table 8 is modified to reflect its sharing from the user having user ID "91358671" to user having user ID "22315410".

TABLE 10

```
<script type="text/javascript"
src="http://static.meteorsolutions.com/meteor.js"></script><script
type="text/javascript">meteor.widget_tracker.get("1","2").-
set({"html":"%3Cobject%20width%3D%22480%22
%20height%3D%22295%22%3E%3Cparam%20name%3D%22movie%-
22%20value%3D%22http%3A//www.youtube.com/v/5mvtU4
xZPvQ%26hl%3Den%26fs%3D1%22%3E%3C/param%3E%3Cparam-
%20name%3D%22allowFullScreen%22%20value%3D%22true%
22%3E%3C/param%3E%3Cparam%20name%3D%22allowscriptaccess-
%22%20value%3D%22always%22%3E%3C/param%3E%3Cembed
%20src%3D%22http%3A//www.youtube.com/v/5mvtU4xZPvQ%26hl-
%3Den%26fs%3D1%22%20type%3D%22application
/x-shockwave-
flash%22%20allowscriptaccess%3D%22always%22%20allowfullscreen-
%3D%22true%22%20width%3D%22480%22%20height
%3D%22295%22%3E%3C/embed%3E%3C/object%3E",
"embed_code_from_id":"22315410"}).track( ).write( );</script
>
```

Figure 6:
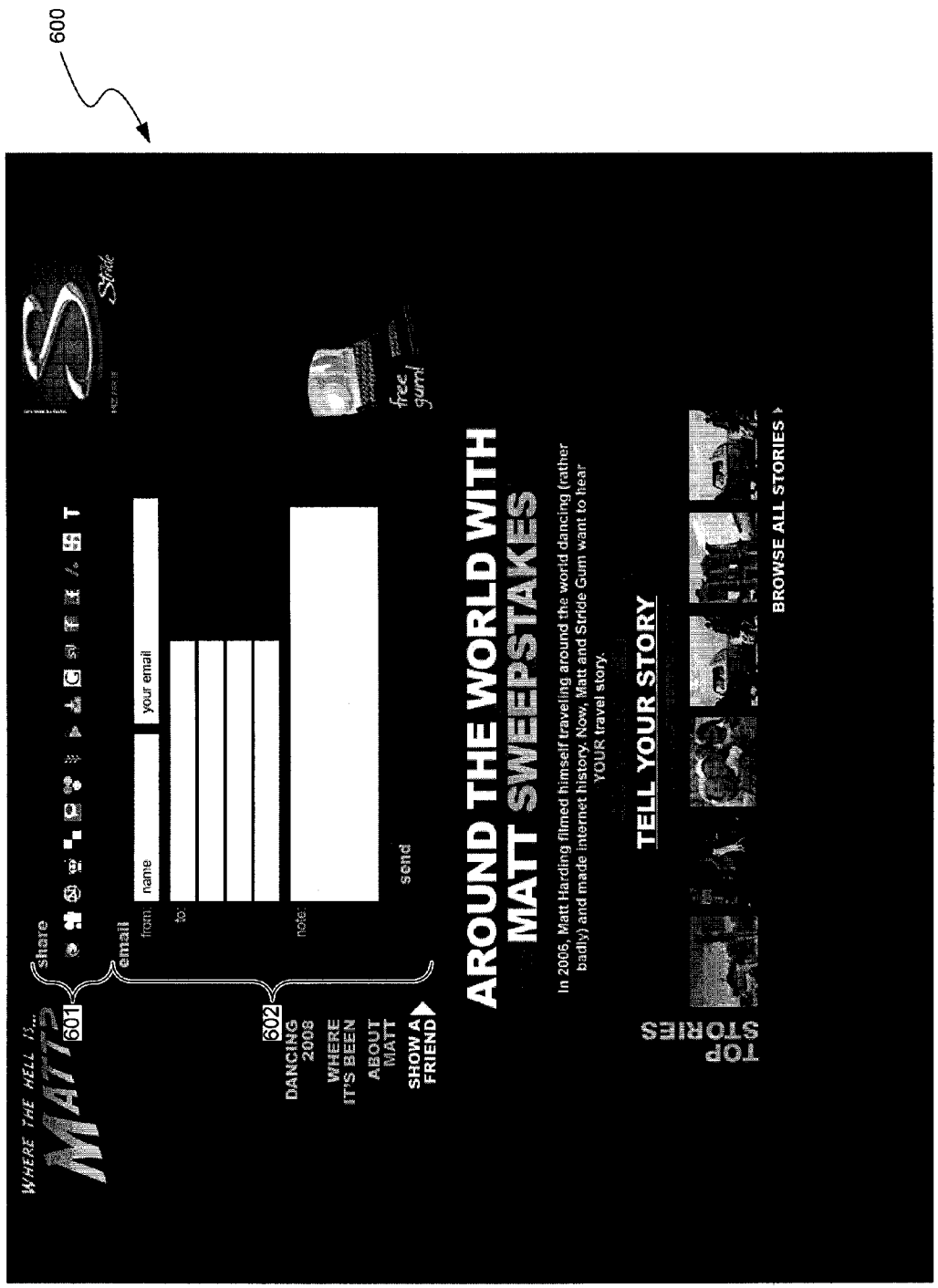
FIG. 6 is a display diagram showing a sample display presented by the facility in some embodiments in order to permit explicit sharing of content.

In some embodiments, the facility tracks explicit sharing along with implicit sharing. In some embodiments, the facility provides explicit sharing functionality that a user may use in order to share functionality for explicitly sharing content in connection with content. For example, FIG. 6 is a display diagram showing a sample display presented by the facility in some embodiments in order to permit explicit sharing of content. The display 600 includes certain content about a world travel adventure. The display also includes a number of icons 601 for popular content sharing sites that the user may select in order to share the content via the selected site. Alternatively, the user may use email section 602 to generate and send an email message sharing the content to one or more other users. In such embodiments, the facility typically creates a new node for each recipient to whom the piece of content is explicitly shared, so that the creation of this node and any descendent nodes is not conditioned upon the recipient accessing the content in a detectable way. In some embodiments, this functionality includes mechanisms for maintaining and using a list of frequently shared-with users. Also, the functionality can be tied to accounts maintained by the user on multiple sharing sites to further automate sharing via these sharing sites.

In some embodiments, the facility tracks conversions, which it then relates to sharing of content. In order to take advantage of such conversion tracking and attribution, the operator of the web site causes client-side tracking code to be called whenever a conversion occurs on their web site. In some embodiments, the call to the client-side tracking code identifies a type of conversion that was performed to get to the current page, or a particular value for the conversion.

To track a typical conversion within this system, the facility performs the process shown in Table 11 below.

TABLE 11

1. An end-user visits a page whose content has its sharing trajectory tracked.
2. The end-user is assigned a URL ID, which is kept in the persistent storage of his or her browser. The user may have arrived at the page as a result of sharing, in which case he or she will also have a parent URL ID stored in the sharing trajectory graph.
3. The end-user continues to browse and at some point converts as defined by the site owner by placing the client-side tracking code in the page representing conversion.

TABLE 11-continued

4. The client-side tracking code is run; it generates an HTTP request to the application server containing the end-user's URL ID, the URL of the current page, the HTTP referrer of the current page, and the URL of the entry point.
5. The server, receiving the request from the client's browser, consults the sharing trajectory associated with the client's URL ID. If the URL ID has a parent, the conversion has resulted from sharing; if it has no parent, the conversion has not resulted from sharing. This fact, along with the other data sent by the client's browser, is stored in a database.

In some embodiments, the facility includes tools to analyze the data to derive meaningful and important information about the conversions that occur on a site. The following information can be determined from the data gathered above as shown below in Table 12.

TABLE 12

1. The conversion rate from sharing can be defined as the ratio of conversions with a parent Node ID to the number of Node IDs with parents for a given site.
2. The conversion rate among visits not resulting from sharing can be defined as the ratio of conversions without a parent Node ID to the number of Node IDs without parents for the same site.
3. Since conversions are attributed to nodes in a sharing trajectory graph, the conversions attributed to each node can be aggregated to that node's parent. This gives us for each node the number of conversions which resulted indirectly from sharing starting at that node, as well as the conversion rate among visits which resulted indirectly from sharing.
4. Since the site owner can generate seed nodes for expected sources of traffic (e.g. a display advertising campaign; this is a feature of the sharing trajectory graph) the conversion rates for such sources of traffic can be compared with the conversion rate from sharing.
5. If the site owner can place a dollar value on the conversions detected at a given URL, the system can compute the revenue generated for the site owner as a result of sharing, allowing the site owner to make judgments about the return on investment of his or her activities to encourage sharing.

Figure 7A:
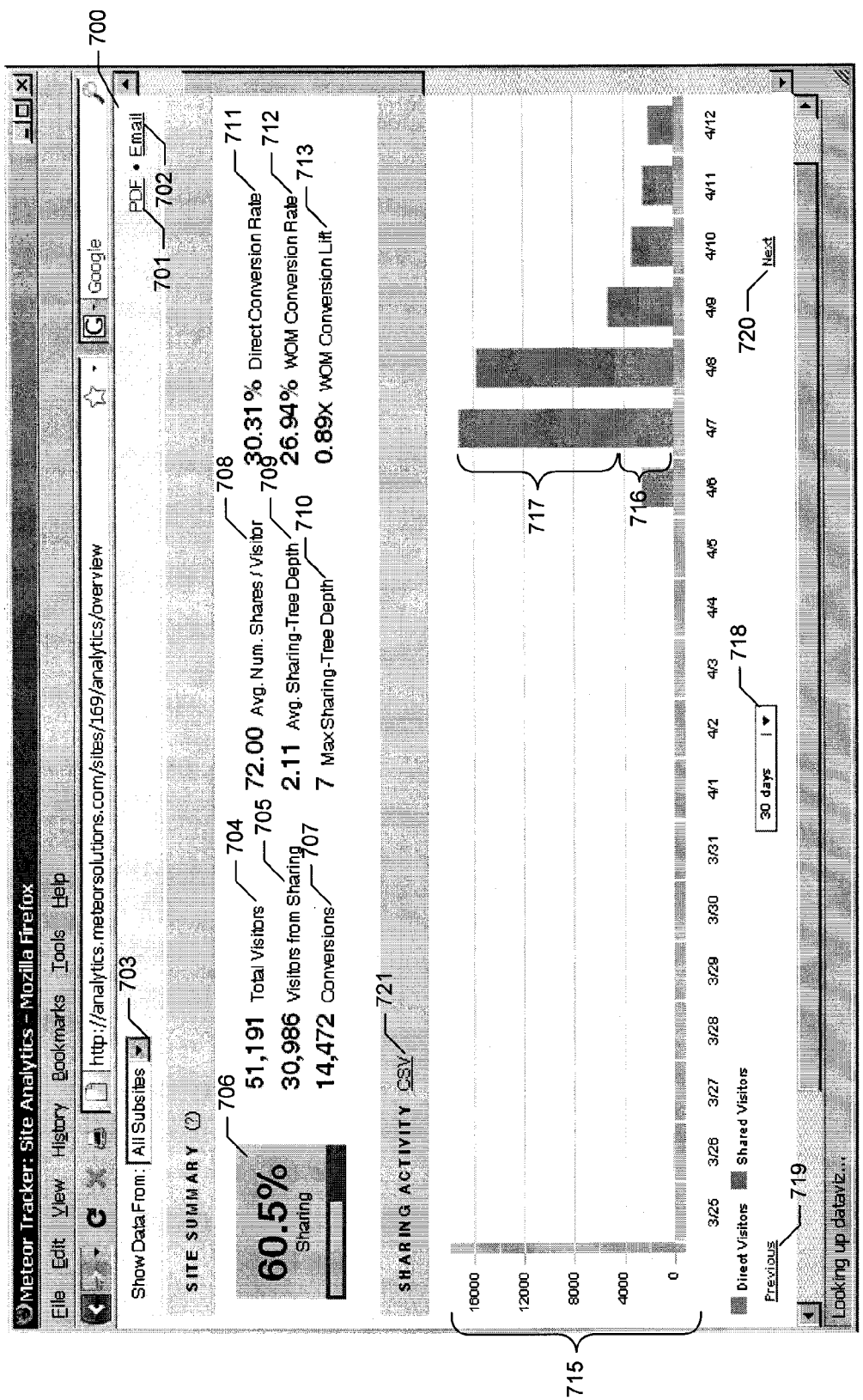
FIGS. 7A-7B are display diagrams showing sample displays typically presented by the facility in order to convey the results of its sharing analysis and conversion attribution.
Figure 7B:
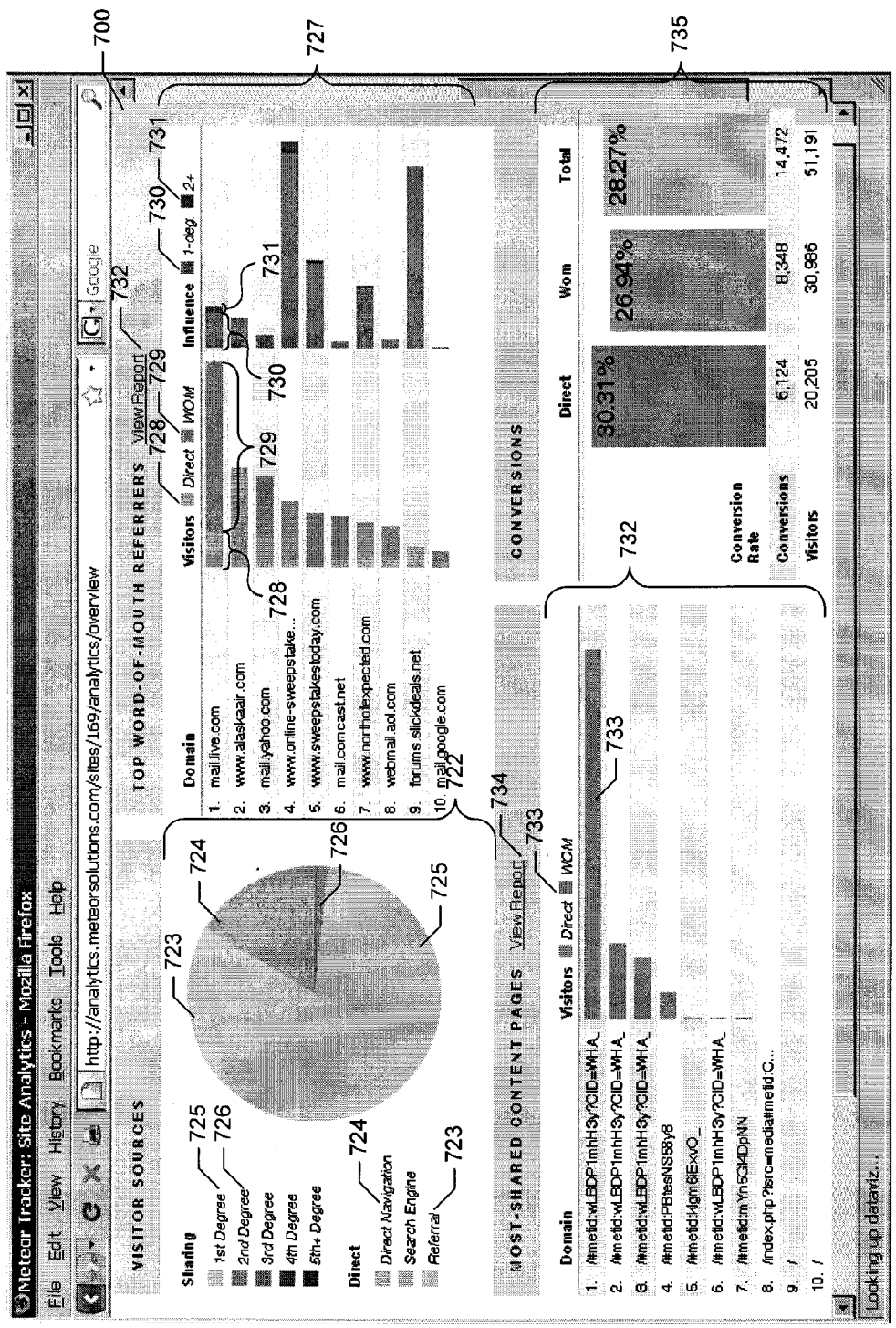

In some embodiments, the facility provides user interfaces for conveying one or more types of data generated by the facility. FIGS. 7A-7B are display diagrams showing sample displays typically presented by the facility in order to convey the results of its sharing analysis and conversion attribution. The display 700 includes controls 701 and 702 to generate a PDF file and an email, respectively, with the same contents as display 700. The display further includes a control 703 that can be used to select between displaying data relating to the publisher's entire web site and data relating to individual subsites within the publisher's web site. The display includes overall summary statistics 704-713 as follows: Indication 704 shows the total number of visitors to pages of the publisher's site that the publisher has selected for tracking. Indication 705 shows the number of these visitors that visited a page of the publisher's site in response to the sharing of content with them. Indication 706 shows the percentage of total visitors that visited as the result of sharing. Indication 707 shows the number of conversions that were performed among total visitors 704. Indication 708 shows, among the users who shared content, the average number of visitors from sharing produced by each such user sharing content. Indication 709 shows the average length of a sharing chain from the first user who shared content at the beginning of the chain to the last user to whom content was shared at the end of the chain. Indication 710 shows the length of the longest such sharing chain. Indication 711 shows the rate at which users who visited the site directly converted. Indication 712 shows the rate at which users who visited the site as the result of sharing converted. Indication 713 shows the ratio of indication 712 to indication 711.

The display further includes a bar graph 715 showing, for each day in a period of time, the number of direct visitors to the subject web site and the number of visitors to the subject web site that resulted from sharing. For example, on the date April 7, the bar graph shows that slightly more than 4,000 users visited the web site directly, while over 12,000 users visited the web site as the result of sharing. The display also includes control 718 for specifying the number of days' data showing one time in the bar chart, and controls 719 and 720 for navigating forward and backward in time for the bar chart.

Turning to FIG. 7B, the display further includes a pie chart 722 of all of the sources of visitors for the subject web site. The pie chart includes segments for users who visited the web site as a result of a referral 723; users who visited the web site as the result of direct navigation 724; users who visited the web site as the result of first degree sharing 725 (i.e., users who were at the end of a two-user sharing chain); and users who visited as the result of second degree sharing 726.

The display further includes a bar chart 727 showing, for different referrer domains, the impact that the referrer domain has on the subject web site. The bar chart includes, for each referrer domain, the number of users who directly navigated from the referrer web site to the subject web site; the number of users who visited the subject web site from the referrer web site as the result of sharing 729; and the total number of visits produced by users from the referrer web site sharing with other users, both in sharing chains that are two users long 730 and sharing chains that are three or more users long 731. The display further includes a control 732 that the user may use in order to generate a more detailed version of bar chart 727.

The display further includes a bar chart 732 showing, among the pages of the subject web site that are selected for tracking, the number of direct and word of mouth users who visited each of these pages. The display also includes a control 734 that the user may select in order to view a more detailed version of this bar chart.

The display further includes a bar chart 735 showing, for direct visits, word of mouth visits, and total visits: the number of conversions, the number of visitors, and the conversion rate that results from dividing the former by the latter.

In some embodiments, the facility geographically maps the trajectory of content using existing techniques to resolve approximate geographic locations for shared-from and shared-to users from those users' IP addresses. The geographic mapping is a map on which the geographic locations determined for users with whom the content was shared are shown to be connected with the geographic locations determined for the users who shared the content with them.

Figure 8:
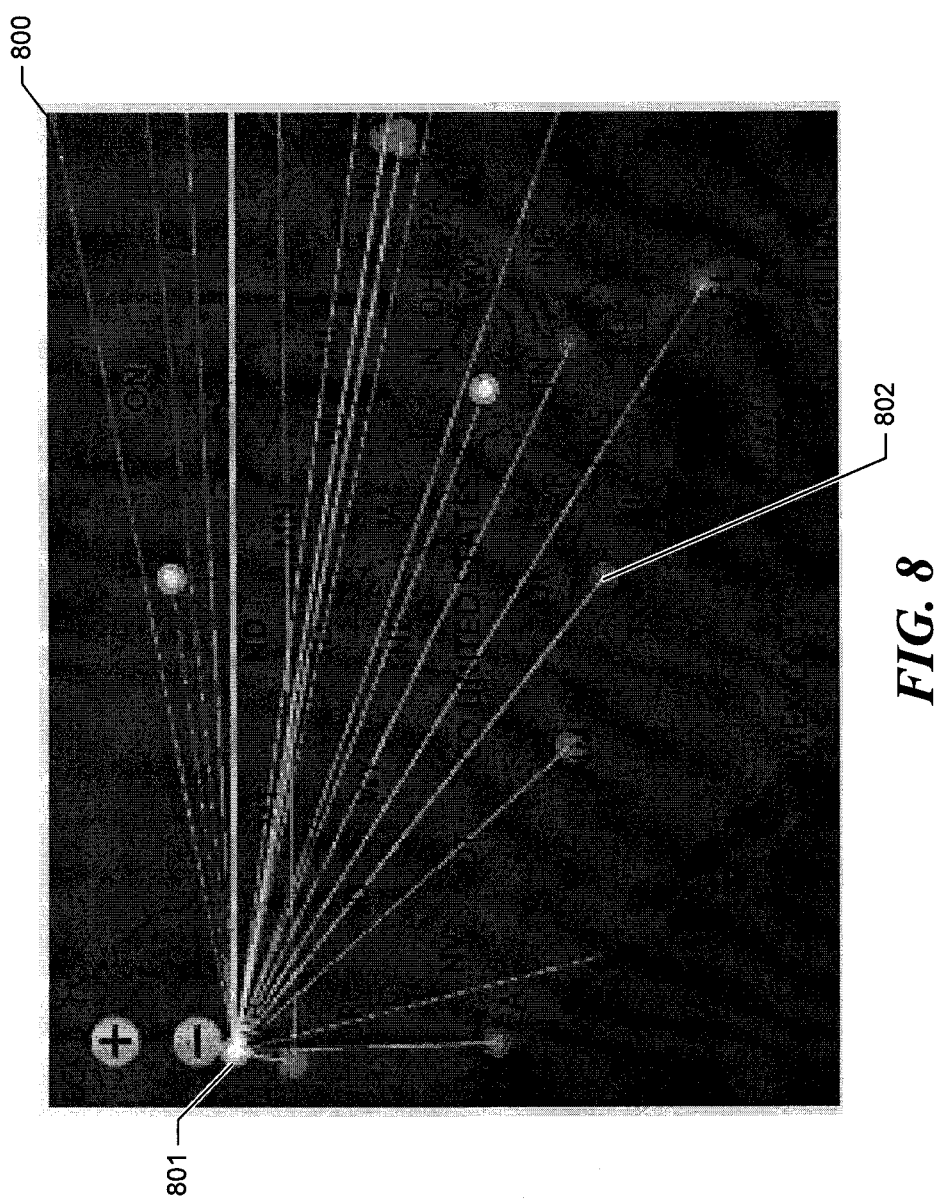
FIG. 8 is a display diagram showing a sample display presented by the facility in some embodiments to illustrate sharing geographically.

FIG. 8 is a display diagram showing a sample display presented by the facility in some embodiments to illustrate sharing geographically. The display 800 shows a segment between a point 801 in Washington and a point 802 in Texas that indicates that a user in Washington shared the content with a user in Texas. In some embodiments, users can interact with geographic mappings, such as by selecting one of the displayed nodes to display additional information about the corresponding user or that user's sharing behavior.

In some embodiments, the system performs and/or displays the results of trajectory tracking in connection with one or more aspects of the system described in U.S. patent application Ser. No. 11/756,068, filed May 31, 2007, which is hereby incorporated by reference in its entirety.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. One or more persistent storage devices collectively containing a content sharing tracking data structure for distinguished content, the data structure for access by an application executed on a computing device and comprising a plurality of entries, each entry comprising:
    information indicating a first URL assigned to a first user, the first URL configured to access the distinguished content, wherein the first URL was assigned to the first user as a direct result of the first user accessing the distinguished content using a second URL and the second URL being modified to obtain the first URL, and wherein the modifying comprises one or more of:
        automatically substituting, in an application used to access the distinguished content, the first URL for the second URL;
        performing a redirect operation from the second URL to the first URL; and
        modifying the second URL in an address bar of a web browser; and
    information either (1) identifying an entry indicating an identifier for a second user who has accessed the distinguished content and shared the distinguished content with the first user indicated by the current entry or (2) indicating that the first user originated the distinguished content,
such that the contents of the data structure may be used to determine sharing patterns for the distinguished content.

2. The persistent storage devices of claim 1 wherein a first entry comprises information identifying a second entry distinct from the first entry, and wherein the second entry comprises information identifying a third entry distinct from the first and second entries.

3. A persistent storage device whose contents are configured to cause computing system to perform operations for tracking the sharing of distinguished content, the operations comprising:
    when a user seeks to access the distinguished content from a client computer system using a first URL associated with the distinguished content, determining whether a user identifier is represented in the first URL;
    determining whether a user identifier is represented in the first URL that is different from a user identifier persistently stored by the client computer system; and
    only if it is determined that a user identifier is represented in the first URL that is different from a user identifier persistently stored by the client computer system:
        determining that the distinguished content has been shared, with a user identified by the user identifier that is persistently stored by the client computer system, by a user identified by the identifier represented in the first URL; and
        automatically modifying, as a direct result of the first user accessing the distinguished content, a URL to be a second URL accessible to the user, such that the second URL contains a representation of the user identifier that is persistently stored by the client computer system, wherein the modifying comprises one or more of:
            automatically substituting, in an application used to access the distinguished content, the second URL for the first URL;
            performing a redirect operation from the first URL to the second URL; and
            modifying the first URL in an address bar of a web browser.

4. The persistent storage device of claim 3 wherein the method is performed in the client computer system.

5. The persistent storage device of claim 3 wherein the method is performed in a server computer system that is distinct from the client computer system.

6. The persistent storage device of claim 3 wherein the method is performed across two or more server computer systems that are each distinct from the client computer system.

7. The persistent storage device of claim 3 wherein the method further comprises, if no user identifier is persistently stored by the client computer system, determining that the distinguished content has been shared with a user not having a user identifier.

8. The persistent storage device of claim 3, further comprising:
    determining that the user performs a conversion after seeking to access the distinguished content; and
    where it was determined that the distinguished content has been shared with a user identified by the user identifier that is persistently stored by the client computer system by a user identified by the identifier represented in the URL, storing an indication that the conversion resulted from sharing by a user identified by the identifier represented in the URL.

9. The persistent storage device of claim 3, wherein the determining whether a user identifier is represented in the first URL comprises:
    extracting a substring from the URL; and
    determining whether the extracted substring matches the user identifier persistently stored by the client computer system.

10. The persistent storage device of claim 3, wherein the determining whether a user identifier is represented in the first URL comprises:
   extracting a substring from the URL;
   identifying a mapping from the extracted substring to a mapped-to user identifier; and
   determining whether the mapped-to user identifier matches the user identifier persistently stored by the client computer system.

11. The persistent storage device of claim 7 wherein the method further comprises, if no user identifier is persistently stored by the client computer system:
   designating an identifier for the user of the client computer system; and
   persistently storing the designated identifier on the client system.

12. The persistent storage device of claim 10 wherein the extracted substring maps indivisibly to both a mapped-to user identifier and the distinguished content.

13. The persistent storage device of claim 12 wherein the URL specifies the domain of a URL shortening service.

14. A method in a computing system for tracking the sharing of distinguished content, comprising:
   when a user seeks to access the distinguished content from a client computer system using a first reference identifying the distinguished content, determining whether a user identifier is represented in the first reference;
   determining, by one or more processors of the computing system, whether a user identifier is represented in the first reference that is different from a user identifier that is persistently stored by the client computer system; and
   only if it is determined that a user identifier is represented in the first reference that is different from a user identifier that is persistently stored by the client computer system,
      determining that the distinguished content has been shared with a user identified by the user identifier that is persistently stored by the client computer system by a user identified by the identifier represented in the first reference; and
      automatically modifying, as a direct result of the first user accessing the distinguished content, the first reference to be a second reference such that the second reference contains a representation of the user identifier that is persistently stored by the client computer system, wherein the modifying comprises one or more of:
         automatically substituting, in a program used to access the distinguished content, the second reference for the first reference;
         performing a redirect operation from the first reference to the second reference; and
         modifying a character sequence in an address bar of a browser.

15. One or more persistent storage devices collectively containing a conversion tracking data structure for access by an application executed on a computing device, the data structure comprising a plurality of entries each containing:
   information identifying a conversion event performed by a performing user; and
   for at least a portion of the entries, information identifying a sequence of two or more sharing users, corresponding to other entries in the data structure, the two or more sharing users being other than the performing user, wherein the sharing of content with the performing user by the two or more sharing users has been determined to produce the conversion event identified by the entry;
   wherein, the information identifying the sequence of two or more sharing users was created at least in part by each of the sharing users:
      accessing a first reference for the content,
      receiving, as a direct result of the accessing the first reference for the content, a modified reference for the content, wherein the modified reference was created by one or more of:
         automatically substituting, in an application used to access the distinguished content, the modified reference for the first reference,
         performing a redirect operation from the first reference to the modified reference, and
         modifying a character sequence in an address bar of a browser; and
      providing the modified reference to the performing user.

16. A method in a client computer system for tracking the sharing of a distinguished widget, comprising:
   retrieving a web page containing code for incorporating the distinguished widget into the web page;
   comparing, by one or more processors of the client computer system, a user identifier contained in the code to an identifier persistently stored in the client computer system; and
   only if the user identifier contained in the code differs from the user identifier persistently stored in the client computer system:
      transmitting the following to a tracking server computer system: the user identifier contained in the code, the user identifier persistently stored in the client computer system, and a widget identifier contained in the code; and
      automatically modifying, as a direct result of retrieving the web page, the code such that the code contains the identifier persistently stored in the client computer system, wherein the modifying comprises one or more of:
         automatically substituting, in a program used to access the distinguished content or in a program used to share the distinguished widget, the modified code; and
         performing a redirect operation, for a least a portion of the web page, to a second portion of a web page containing the modified code.

17. The method of claim 16, further comprising:
   receiving the transmission; and
   in response to the transmission, storing an indication that a user identified by the transmitted user identifier contained in the code shared a widget identified by the transmitted widget identifier contained in the code with a user identified by the transmitted user identifier persistently stored in the client computer system.

18. The method of claim 16, further comprising, making available to a user of the client computer system, for incorporation into a web page other than the retrieved web page, a copy of the modified code.

19. The method of claim 17 wherein automatically substituting the modified code comprises:
   making a copy of the code;
   replacing the user identifier contained in the copy of the code with the user identifier persistently stored in the client computer system; and
   causing the copy of the code in which the replacement has been performed to be displayed as part of a rendered web page in either the program used to access the distinguished content or in the program used to share the distinguished widget.

20. The method of claim 16 wherein automatically substituting the modified code comprises:

making a copy of the code;

replacing the user identifier contained in the copy of the code with the user identifier persistently stored in the client computer system; and causing the copy of the code in which the replacement has been performed to be copied to a clipboard program used to share the distinguished widget and maintained by the operating system.

21. The method of claim 18 wherein the facility makes available to a user of the client computer system, for incorporation into a web page other than the retrieved web page, a copy of the modified code by, in the code contained by the web page, replacing the user identifier contained in the code with the user identifier persistently stored in the client computer system.

22. The method of claim 19 wherein the rendered web page is a rendered version of the retrieved web page.

23. The method of claim 19 wherein the rendered web page is a rendered version of a web page other than the retrieved web page.

* * * * *